US011169093B2

(12) United States Patent
Jackson et al.

(10) Patent No.: US 11,169,093 B2
(45) Date of Patent: Nov. 9, 2021

(54) CHEMILUMINESCENCE DETECTOR

(71) Applicant: Randox Laboratories Ltd., Crumlin (GB)

(72) Inventors: Stuart Jackson, Crumlin (GB); Ivan McConnell, Crumlin (GB); Peter Fitzgerald, Crumlin (GB)

(73) Assignee: Randox Laboratories Ltd., Crumlin (GB)

( * ) Notice: Subject to any disclaimer, the term of this patent is extended or adjusted under 35 U.S.C. 154(b) by 387 days.

(21) Appl. No.: 16/069,492

(22) PCT Filed: Jan. 13, 2017

(86) PCT No.: PCT/GB2017/050088
§ 371 (c)(1),
(2) Date: Jul. 11, 2018

(87) PCT Pub. No.: WO2017/122027
PCT Pub. Date: Jul. 20, 2017

(65) Prior Publication Data
US 2019/0025221 A1 Jan. 24, 2019

(30) Foreign Application Priority Data
Jan. 15, 2016 (GB) ..................................... 1600812

(51) Int. Cl.
*G01N 21/76* (2006.01)
*G01N 21/64* (2006.01)

(52) U.S. Cl.
CPC ........... *G01N 21/76* (2013.01); *G01N 21/645* (2013.01); *G01N 21/6428* (2013.01);
(Continued)

(58) Field of Classification Search
CPC .. G01N 21/76; G01N 21/6452; G01N 21/645; G01N 21/6456; G01N 21/6428; G01N 21/6486
See application file for complete search history.

(56) References Cited

U.S. PATENT DOCUMENTS

2003/0098692 A1   5/2003   Cotton
2007/0247609 A1*  10/2007  Heerens ................ G03F 9/7003
                                                               355/75
(Continued)

FOREIGN PATENT DOCUMENTS

EP    3 056 894 A1    8/2016
WO    2012/027788 A1  3/2012
WO    2015/053290 A1  4/2015

OTHER PUBLICATIONS

Mason, William, Written Opinion of the International Searching Authority, European Patent Office, PCT/GB2017/050088.

*Primary Examiner* — Lore R Jarrett
(74) *Attorney, Agent, or Firm* — Gavrilovich, Dodd & Lindsey LLP

(57) ABSTRACT

The present invention provides a chemiluminescence detector, which comprises an image capture device sensitive to chemiluminescence located within a container. The container has an array of apertures located in a field of view of the image capture device, and each aperture is defined by a through-bore in a wall of the container. The exterior of the container is engagable with a plurality of sample holders, each sample holder being in alignment with a respective aperture when engaged with the exterior of the container. The passage of light into the container through each aperture is restrictable by a closure device, passage of light into the container through the apertures is thereby controllable.

27 Claims, 5 Drawing Sheets

(52) U.S. Cl.
CPC ..... *G01N 21/6452* (2013.01); *G01N 21/6456* (2013.01); *G01N 21/6486* (2013.01)

(56) References Cited

U.S. PATENT DOCUMENTS

| | | |
|---|---|---|
| 2012/0169884 A1 | 7/2012 | Dodds |
| 2013/0184188 A1 | 7/2013 | Ewart et al. |
| 2013/0280748 A1 | 10/2013 | Gebetsroither et al. |
| 2014/0296112 A1* | 10/2014 | O'Driscoll ............ G01J 3/0208 506/39 |
| 2015/0260579 A1 | 9/2015 | Toriumi |
| 2015/0373309 A1 | 12/2015 | Tuch et al. |

* cited by examiner

CHEMILUMINESCENCE DETECTOR

CROSS REFERENCE TO RELATED APPLICATION

This application is a U.S. National Stage Application filed under 35 U.S.C. § 371 and claims priority to International Application No. PCT/GB2017/050088, filed Jan. 13, 2017, which application claims priority to Great Britain Application No. 1600812.0, filed Jan. 15, 2016, the disclosures of which are incorporated herein by reference in their entireties.

FIELD OF THE INVENTION

The present invention relates to detection of chemiluminescence. In particular, the present invention relates to detection of chemiluminescence produced from multiple sources, such as a plurality of discrete microarrays on which assays are conducted.

BACKGROUND

There are many occasions where there is a desire to conduct analysis on chemicals, or the constituents of chemicals. This is achievable by measuring one or more properties of an analyte, such as measuring a glucose concentration in a substance.

For such analysis and testing to be industrially viable, measurements are commonly carried out on multiple analytes simultaneously. This is known as multianalyte analysis.

Usually, only a small quantity of each analyte is measured. This is because it is either desirable to only use a small amount of each analyte, or many tests are to be carried out on a single analyte that is divided into a number of specimens to enable discrete testing to be applied to each specimen. This means that each analyte or specimen is commonly held on or within a sample in a sample holder.

Additionally, to measure particular properties of an analyte, a multistep procedure may need to be conducted. These are known as assays.

Whether a single step or multistep process is conducted, due to the quantity of each analyte or specimen used, these are usually placed in a "microarray", so called due to the regular pattern in which they are placed, the size of the array and the quantities of analyte or discrete specimens used. An example of a microarray is a biochip, on which many biochemical reactions can be conducted simultaneously.

Additionally or alternatively, each specimen or analyte may be passed through a microfluidic circuit.

When highly sensitive measurements are to be taken, or particular materials are to be measured, analytes or specimens are reacted with one or more other substances that cause chemiluminescence in particular circumstances, such as when particular concentrations or materials are present. The occurrence or absence of chemiluminescence then needs to be detected to ascertain whether the desired properties are present in an analyte.

Chemiluminescence usually only produces a small amount of light. This makes it difficult to detect under ordinary room lighting, meaning that a number of step are taken to allow suitable detection of chemiluminescence. As such, for multianalyte microarray analysis where there is the possibility of chemiluminescence, it is known to conduct the whole analysis process inside a container that restricts light ingress, and to use highly sensitive cameras to detect chemiluminescence. Such cameras have larger pixels than less sensitive cameras, have sensors that are actively cooled, are designed to show minimal dark current, have optimised quantum efficiency for the wavelength range of about 300 nanometres (nm) to about 600 nm, have high dynamic range and/or electronics that pertain to low read noise.

However, providing a suitable container is difficult, especially when multiple discrete microarrays are to be analysed. This is because the equipment needed to conduct the analysis takes up a large amount of space due to the need for components to move the microarrays between each stage of the analysis process and the components required to carry out steps in the analysis process, such as to add substances to each micro array. For example, though sizes vary, known chemiluminescence detectors typically have a footprint of about 400 millimetres (mm) by about 600 mm.

Maintaining sufficiently low light levels in such a large space is difficult to achieve, and usually requires the container to be sealed in some manner. This also means that once an analysis process has begun, it is impossible to add further analytes, which limits flexibility and turnover of analytes. There is therefore a desire to improve the ability to maintain low light levels and a desire to improve flexibility in the analysis process.

A known means of reducing the container size is to only maintain light level restrictions in one region. This is achieved by passing microarrays to be imaged into a container that restricts the ingress of light. However, the microarrays are passed through a port in a wall of the container, which reduces the effectiveness of the light level restriction because light is able to pass through the port even when precautions are taken.

As such, there is still a need to improve flexibility of multianalyte analysis whilst also providing suitable light ingress restrictions to allow detection chemiluminescence.

SUMMARY OF INVENTION

According to a first aspect, there is provided a chemiluminescence detector, comprising an image capture device sensitive to chemiluminescence located within a container, the container having an array of apertures located in a field of view of the image capture device, each aperture being defined by a through-bore in a wall of the container, the exterior of the container being engagable with a plurality of sample holders, each sample holder being in alignment with a respective aperture when engaged with the exterior of the container, wherein passage of light into the container through each aperture is restrictable by a closure device, passage of light into the container through the apertures thereby being controllable.

This provides a means of detecting chemiluminescence emitted from a plurality of samples without needing the sample holders to be located within a light restricted environment. This is achieved by the containment of the image capture device in a light restricted environment and the provision of a means for temporarily allowing light to pass from a sample into the light restricted environment within the container while maintaining restrictions on light ingress from the environment. This allows light emission from the samples to be imaged without compromising the ability of the container to restrict the entry of light from other sources. A particular advantage of this is that rates of misdiagnosis from chemiluminescence detection can be reduced due to the improvement in the image quality produced using the detector.

Of course, the detector may be suitable for detecting multiple sources of chemiluminescence. This is due to the detector typically being configured to detect chemiluminescence from a plurality of sources instead of possibly just one source. Accordingly, the detector may be referred to as a multi-source chemiluminescence detector.

Although restricting light ingress to the interior of the container is important, the walls of the container may be configured to provide user access through the walls of the container. Physical access may be provided by a door in a wall of the container. Typically however, a plurality of walls define the container, and at least a part of the plurality of walls is separable from the container. This provides user access to the interior of the container to allow the components contained within the container to be serviced and maintained. Additionally, this allows the detector to be manufactured in stages instead of requiring the components to be installed as the container is built as would be the case if the container were made of a single piece of material.

When at least a part of the plurality of walls (such as a whole wall or part thereof) is separable from the container, the separable part and the remaining part of the plurality of walls will of course fit together. As such, the separable part may be shaped to fit into the remaining part of the plurality of walls. Typically, each separable part of the plurality of walls has a perimeter surface abutable to a complementary perimeter surface of the plurality of walls, said perimeter surfaces forming a complementary pair of perimeter surfaces, each respective complimentary pair of perimeter surfaces being configured to suppress light ingress to the interior of the container.

This allows a part of the plurality of walls to be separable without compromising the container's ability to restrict passage of light into the interior of the container. If the separable part merely abutted the section of the plurality of walls to which it fitted, then light would potentially be able to pass between the separable part and the section of the plurality of walls to which it fitted. However, by being configured to supress light ingress between the perimeter surfaces, the interior of the container is accessible by a user without compromising the ability of the container to restrict light ingress when the separable part is fitted to the container.

The configuration of each pair of perimeter surfaces allowing light ingress to be supressed may be provided by the shape of the perimeters, such as a lip being provided. Typically though, each perimeter surface comprising a textured portion complementary to a textured portion on the perimeter surface with which the respective perimeter surface forms a pair of perimeter surfaces.

Complimentary textured portions are highly effective at restricting passage of light. This is because the path that each photon of light must take through the textured portions involves a greater number of reflections and corresponding deviations from its previous and original path than involved when using other shaping of the pair of perimeters. This makes the complimentary textured portions more effective than other techniques for supressing light passage between the separable part and the section of the plurality of walls to which it fits. This means that the textured portions can be smaller than other means for supressing light ingress, allowing less material to be used.

Each textured portion may be any texture, such as irregular, pitted and/or polygonal. Typically, each textured portion comprises a plurality of ribs arranged in rows orientated such that each rib forms a continuous ring around the respective perimeter. This is advantageous as the ribs are simple to manufacture and provide suitable suppression of light ingress by interdigitating ribs of one textured portion with ribs of a complementary textured portion. This also makes fitting the separable part to the section to which it fits simple, and wear is reduced, as is the likelihood of the part being misaligned with the section to which it fits by a user. This makes the light ingress suppression provided more reliable.

The container may have a single closure device that is able to restrict passage of light through all of the apertures at once. However, typically, the detector comprises a plurality of closure devices, wherein each closure device is able to restrict passage of light through only a single aperture. This restricts the ability of each closure device to permit passage of light into the container, which reduces the amount of light entering the container when only some of the closure devices are not restricting light ingress. This keeps the ambient light level inside the container as low as possible, allowing higher quality images to be captured.

The plurality of closure devices may function in groups so that a number of the closure devices operate together, or all operate as a single group, but typically, each closure device is able to restrict passage of light through a single aperture independently of each other closure device. This allows each closure device and therefor passage of light through each aperture to be separate from each other closure device and aperture giving a greater degree of flexibility in operating the detector and choosing when to permit or restrict passage of light through an aperture, and which apertures to permit or restrict passage of light through.

Each closure device has an open position in which it permits light to pass into the container and a closed position in which it restricts passage of light into the container. Typically, each closure device is moveable between a closed position and an open position, wherein in the closed position each respective closure device provides a barrier between the exterior of the container and the interior of the container across the entire aperture through which said closure device is able to restrict the passage of light, and in the open position the barrier is at most across a part of said aperture. This allows each closure device to restrict light passage into the container when in one position, but permit light passage into the container when in another position.

Each closure device may be an iris or any other form of closure device. Typically however, each closure device is a shutter.

Shutters are simple to operate and maintain are more simple to install that other closure devices, such as irises, while still being effective at restricting passage of light. This makes manufacture of the detector more simple.

The shutters can be located in the apertures or on the exterior of the container, though typically, when each closure devices is a shutter, in the closed position, a surface of each respective shutter abuts a wall of the container on the inside of the container and is located over at least one through-bore defining an aperture, and in the open position, there is a gap between said surface of said shutter and said wall of the container. This allows each shutter to be located within the container so that there is no chance of them interacting directly with the sample holders when engaged with the container. Additionally, locating the shutters outside of the apertures allows the shutters to be larger and therefore more effective at restricting passage of light into the container, as less light is able to travel around each shutter.

Each shutter may be moveable about any axis to move it from one position to another. Typically, each shutter is rotatable about an axis at an edge of the respective shutter. This again allows each shutter to be larger than an aperture since no part of the aperture is required to be located in the aperture when in any position, which increases the amount of light able to be permitted into the container when the shutter is in the open position. Further, it allows the shutters to be located close to each other because no area is needed for the shutter to move into from its closed position.

Preferably, each shutter is able to rotate through 95 degrees (95°) between the closed position and the open position. Although each shutter is not required to rotate through 95° to be in the open position, a rotation of 95° reduces the likelihood of a shutter causing any restriction when in the open position to the passage of light through the aperture it is able to cover. This allows each shutter to be moveable from a position in which it restricts passage of light into the container to a position in which all restriction is removed, permitting the maximum possible amount of light to pass into the container.

Each shutter may be moveable between the open and closed positions by hand, or by any other means. Typically, each shutter is rotatable by a motor, preferably the motor comprising a solenoid with a bore therethrough within which is located a magnet, the magnet being connected to a rack with which a pinion is engaged, the pinion being connected to the shutter with its centre aligned with the axis about which the shutter is rotatable. This is advantageous because using a motor allows the movement of each shutter to be controlled remotely, and using a solenoid allows there to be a low number of moving parts. Additionally, only a small amount of movement is required due to the rack and pinion mechanism, which in combination with the solenoid, will allow low wear on the moving components.

The solenoid may be mono-stable, allowing it to drive motion in only one direction. However, typically, the solenoid is bi-stable. This allows the solenoid to control motion in two directions, permitting the solenoid to be used to open and to close a shutter to which it is operably connected.

Each shutter may be freely moveably. Typically though, each shutter is bias towards the closed position. This means that the motor only needs to be able to move each shutter from the closed position to the open position, as the bias allows each shutter to move to the closed position.

Any biasing mechanism may be used to bias each shutter towards the closed position, through typically, the bias is provided by a spring. This provides a simple and reliable mechanism for biasing each shutter to the closed position.

The spring providing the bias for the shutter may be any suitable form of spring. Typically, the spring is a torsion spring. This allows the bias to be applied without further supports being needed, as the torsion spring can push against the container and the shutter while fitted round an axel about which the respective shutter is rotatable.

The detector may further comprise a dock configured to hold each sample holder in alignment with the respective aperture when engaged with the exterior of the container. This provides a means of repeatably engaging sample holders with the container in a suitable position so that light produced by a sample in each sample holder is able to pass into the container. Additionally, repeatable positioning increases the reliability of chemiluminescence detection, as the location from which light enters the container and is then imaged is always the same, allowing anomalies to be more easily spotted and accounted for.

The dock may be configured to restrict passage of light between the exterior of the container and each sample holder when engaged with the exterior of the container. This allows for improved imaging as the amount of light entering the container is further restricted.

The dock may comprise a recessed portion shaped to fit a plurality of sample holders when engaged with the exterior of the container. This assists with holding each sample holder in correct alignment and improves the ability to restrict light ingress between each sample holder and the container when engaged with the container. This is because light from the environment around the detector must reflect round corners to pass between the sample holders and the container.

The detector may further comprise a sensor configured to detect when each closure device is in an open position or in a closed position. This allows it to be known when and when not to capture an image, as it is known when to expect light emitted by a sample to be passing into the container.

The detector may further comprise a sensor configured to detect when a sample holder is engage with the exterior of the container. This allows it to be known when each closure device is to be operated.

According to a second aspect, there is provided chemiluminescence detection apparatus, comprising: a chemiluminescence detector according to the first aspect; and a plurality of sample holders detachably engagable with an exterior of a container of the detector, each sample holder containing at least one sample.

Typically, the exterior of the container and each sample holder are configured to suppress light ingress between the exterior of the container and respective sample holder when said sample holder is engaged with the exterior of the container. This allows each sample holder to be engaged with the exterior of the container without compromising the ability to restrict passage of light into the interior of the container. If each sample holder merely abutted the exterior of the container, then light would potentially be able to pass between the respective sample holder and the exterior of the container. However, by being configured to supress light ingress between the each sample holder and the exterior of the container, the ability of the container to restrict light ingress when each respective sample holder is engaged with the exterior of the container is not compromised.

The exterior of the container may comprise a textured portion around each position at which a sample holder is able to be engaged and each sample holder may comprise a textured portion complementary to the textured portion of the exterior of the container on a surface that abuts the exterior of the container when the respective sample holder is engaged with the exterior of the container. As noted above, complimentary textured portions are highly effective at restricting passage of light. This is because the path each photon of light must take through the textured portions involves a greater number of reflections and corresponding deviations from its previous and original path than other shaping of the complementary textured portions. This makes the complimentary textured portions more effective than other techniques for supressing light passage between each sample holder and the exterior of the container. As such, the textured portions can be smaller than other means for supressing light ingress, allowing less material to be used.

Typically, each textured portion comprises a plurality of ribs arranged in rows orientated such that each rib forms a continuous ring round the textured portion. Again, this is advantageous as the ribs are simple to manufacture and provide suitable suppression of light ingress by interdigitating with ribs of a complementary textured portion.

According to a third aspect, there is provided a method of detecting chemiluminescence, comprising: engaging at least one sample holder containing at least one sample with an exterior of a container of a detector according to the first aspect, each sample holder being in alignment with an aperture in a wall of the container when engaged with the exterior of the container; opening a closure device restricting passage of light into the container through the aperture to allow light to pass into the container from each sample holder; capturing an image of a sample within each sample holder with an image capture device, the field of view of which the aperture is located within; and closing the closure device to restrict passage of light into the container through the aperture. This provides a method of imaging chemiluminescent samples whilst restricting light ingress from other sources, which allows high quality images to be captured that show the chemiluminescence more clearly than if light ingress from other sources was not restricted.

Typically, the method further comprises the step of detecting that at least one sample holder is engaged with the exterior of a container before opening the closure device, and only opening a closure device when a sample holder is detected as being engaged with the exterior of the container in alignment with the aperture through which the closure device restricts passage of light. This reduces the number of redundant opening steps and avoids passage of light through an aperture being permitted when no sample holder is engaged with the exterior of the container and aligned with said aperture.

The method may further comprise the step of detecting that the closure device is open before capturing an image of the sample. This avoids an image being captured when no closure device is open, which reduces the need for images to be recaptured.

Typically, the method further comprises the step of capturing an image with the image capture device before opening the closure device, and preferably before engaging the at least one sample holder with the exterior of the container. This allows any light ingress while the closure device is closed to be identified before capturing an image of one or more samples. Any such light ingress is then able to be accounted for. Additionally, this allows noise cancellation to be conducted as the image captured with the closure device closed can be compared with the image captured with the closure device open.

There may be a plurality of closure devices, each closure device being able to restrict passage of light through only a single aperture, and the method may further comprise the step of only opening each respective closure device restricting passage of light through an aperture when a sample holder is engaged with the exterior of the container and is in alignment with the aperture through which the respective closure device is restricting passage of light. This allows improved images to be captured as light is only allowed to pass into the container through apertures with which sample holders are aligned.

BRIEF DESCRIPTION OF THE DRAWINGS

An example of a chemiluminescence detector is described in detail below, with reference to the accompanying drawings, in which.

DETAILED DESCRIPTION

We now describe one example of a chemiluminescence detector in conjunction with a two sample holders with which the detector forms a chemiluminescence detection apparatus, along with one example method of detecting chemiluminescence. An example method of calibration of the example detector is also described.

Figure 1:
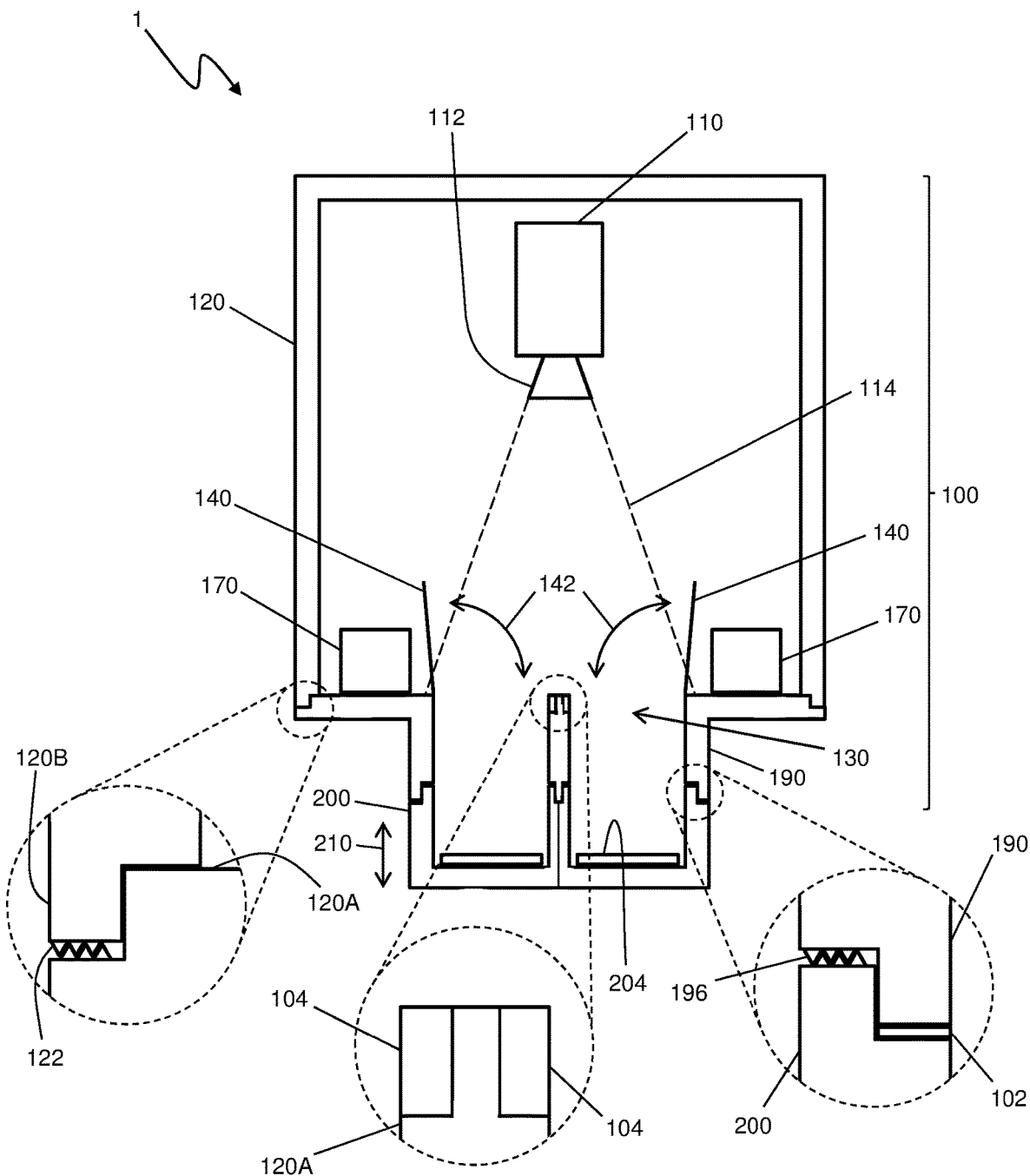
FIG. 1 shows a sectional view of a detector and sample holder.

Referring now to FIG. 1, an example chemiluminescence detection apparatus is illustrated generally at 1. The apparatus 1 has a detector 100 and a plurality of sample holders 200.

The detector 100 has an image capture device. Specifically, in this example, the image capture device is a CCD camera 110, which, as an alternative, could be any device able to capture either static images or video from which individual frames are able to be extracted. To provide protection for the CCD chip (not shown) in the CCD camera, a mechanical shutter 112 is attached to the CCD camera in front of CCD chip.

The CCD camera 110 is held within a container 120 by a support (not shown). To allow the CCD camera to be installed within the container and to provide maintenance access to the CCD camera, the walls of the container are provided by a base plate 120A to which an enclosure 120B is separably engagable.

The base plate 120A and the enclosure 120B fit together to form a cuboid. The enclosure forms five sides of the cuboid and has an open side in place of the sixth side. When the base plate and the enclosure are engaged with each other, the base plate forms the sixth side of the cuboid. As an example, the dimensions of the cuboid, and so the container, are about 100 mm wide, by 100 mm deep, and 250 mm high with the base plate being approximately square.

It is intention for the container 120 to prevent as much light as possible from outside of the container from entering the container when the base plate 120A and the enclosure 120B are engaged with each other. As is explained in more detail below, this is important for improving the detectors sensitivity to chemiluminescence. Accordingly, the base plate 120A and enclosure 120B have complementary shapes where they are come in contact when engaged that are configured to restrict light from passing between them.

To achieve this complimentary shaping, the base plate 120A has a flange around the sides of the base plate. The flange is flush with the lower surface of the base plate, which forms the external surface of the container when engaged with the enclosure 120B, and is less thick than the base plate. This causes the region around the edge of the base plate to form a stepped portion, an upper surface of the flange forming a lower step and the upper surface of the base plate forming an upper step.

As part of the complementary shaping of the base plate 120A and the enclosure 120B, the end surfaces of the walls of the enclosure that form the perimeter of the open side of the enclosure have a recess around their inside edge. This provides a surface on the walls in a parallel plane to the end surface that is set back from the end surfaces.

When the base plate 120A and the enclosure 120B are engaged with each other, they fit together so that the stepped portion of the base plate forms a close fit with the end surfaces of the walls of the enclosure and the recess. In this arrangement, the upper surface of the base plate abuts the set back surface of the recess, and the upper surface of the flange is in contact with the end surfaces of the walls of the enclosure. The upright surfaces of each of the enclosure and the base plate between the end walls and the set back surface and the upper surface of the flange and the upper surface of the base plate respectively are also in abutment when the enclosure and the base plate are in engagement with each other.

This restricts light ingress to the interior of the container 120 as the light is required to change course to pass between the base plate 120A and the enclosure 120B. To further restrict light ingress to the interior of the container, there is also a light tight "labyrinth" 122 (shown in one of the magnified sections of FIG. 1 and in FIG. 2) at the boundary between the base plate and the enclosure.

The light tight labyrinth 122 comprises a plurality of concentric ribs located in a ring on the upper surface of the flange of the base plate 120A. The ribs give a portion of the upper surface of the flange a textured nature, and are positioned so that they cooperate with complementary concentric ribs located in a ring on the end surface of the enclosure 120B. The ribs on the end surface of the enclosure similarly give a portion of that surface a textured nature.

When the base plate and the enclosure are engaged, the ribs on the enclosure are interdigitated with the ribs of the base plate. This assists in preventing light pass into the container by requiring light from outside the container to travel along a path with a high number of corners around which the light would need to be reflected. By using this arrangement, light ingress to the interior of the container 120 between the base plate and the enclosure is limited to up to about 200 photons per minute. As such light ingress to the interior of the container between the base plate and the enclosure is suppressed.

The base plate 120A has through-bores that each defines an aperture 130 in the base plate. In the detector shown in FIGS. 1 to 3, there are two apertures. In an alternative arrangement, the detector has more apertures, such as four, eight, nine or sixteen apertures. Regardless of the number of apertures, the CCD camera 110 is positioned so that each of apertures 130 is located within the field of view 114 of the CCD camera. This allows the CCD camera to image all the apertures (and light passing through one or more of them from a sample) in a single image.

As is described in more detail below, there are occasions when there is a desire to prevent light passing through one or more of the apertures 130. To achieve this, each aperture is able to be covered to by a moveable shutter 140. Each shutter is a "gate" style shutter comprising a plate. To cover an aperture the plate lies across the end of a respective through-bore defining that aperture on the inside of the container 120. So that passage of light round each shutter is restricted as much as possible, when a shutter is covering an aperture, a surface of that shutter is in abutment with the upper surface of the base plate 120A at the end of the respective through-bore that it is lying across. This is referred to as the "closed" position of a shutter hereafter.

Figure 2:
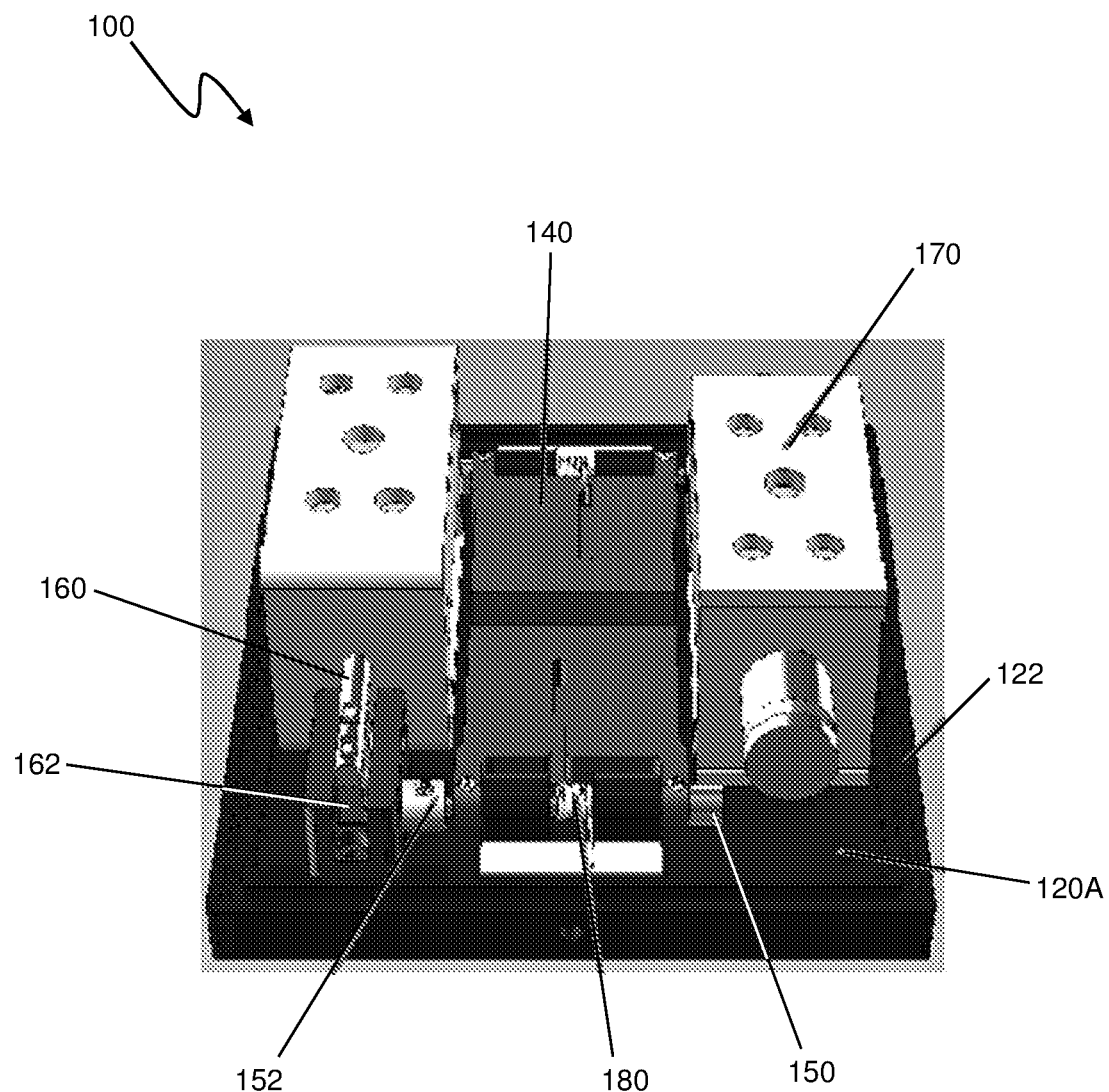
FIG. 2 shows a partial view of the interior of a container of a detector.

As is shown in FIG. 2, to allow light to pass into the interior of the container 120, each shutter 140 is fixedly connected to an axel 150 located at one of its. The fixed connection prohibits relative movement between the shutter and the axel. However, each shutter is able to rotate through 95 degrees (95°) from its closed position to an "open" position. As such, each shutter is moveable between the closed position and an open position, as indicated by arrows 142 in FIG. 1.

In the open position, a respective shutter is in a location that prevents that shutter from affecting the passage of light through the aperture through which it is able to restrict the passage of light into the container to avoid it interfering with any image being captured. As can be seen from FIG. 1, this is a position in which the plate of the shutter is in an upright position, out of contact with the base plate 120A, leaning back relative to the aperture that it covers in the closed position.

Each axel 150 has a gear 152 attached to one of its ends. Each gear is engaged with a toothed block 162 in a rack and pinion arrangement. The toothed block is attached to an end of a magnetic pin 160. The opposing end of the magnetic pin is located coaxially within the bore (not shown) of a solenoid 170.

Each solenoid 170 is controlled by a controller. To move a shutter from the closed position to the open position, the controller causes a current to be driven through the relevant solenoid. In turn, this causes the magnetic pin 160 to be pushed outward from the bore. Each magnetic pin is only moveable along a single axis that passes through the bore of the respective solenoid. As such, when pushed outwardly from the bore of the solenoid, the magnetic pin moves along its axis. This causes, the toothed block 162 to pass over the gear 152 of the respective axel 150, which in turn causes it to rotate, and thereby to rotate the shutter 140 attached to said axel.

There are two alternative arrangements for returning a shutter from the open position to the closed position.

In the first arrangement, the solenoid that controls movement of a shutter is bi-stable. As such, the controller is able to cause a current to be driven through the solenoid in the opposite direction to the direction in which the current is driven when moving the shutter from the closed position to the open position. This pulls the magnetic pin inwardly into the bore, thereby causing the toothed block to rotate the gear, and hence the axel and the shutter, in the opposite direction to that described above causing the shutter to move to the closed position.

In the second arrangement, which is shown in FIG. 2, a torsion spring 180 is located around a portion of a respective axel 150. One end of the torsion spring is positioned against, and applies a force to, the upper surface of the base plate 120A. The opposite end of the torsion spring is positioned against a surface of the respective shutter 140 and is configured provide the shutter with a bias to the closed position. This causes the shutter to return to the closed position when the current being driven in the solenoid ceases (accordingly pushing the magnetic pin 160 inwardly into the bore of the solenoid 170). Clearly, when this arrangement is used, the force able to be applied to the magnetic pin 160 by the solenoid 170 is greater than the force applied to the shutter by the torsion spring. This allows the bias applied by the spring to be overcome, and the shutter to be moved to the open position.

Figure 3:
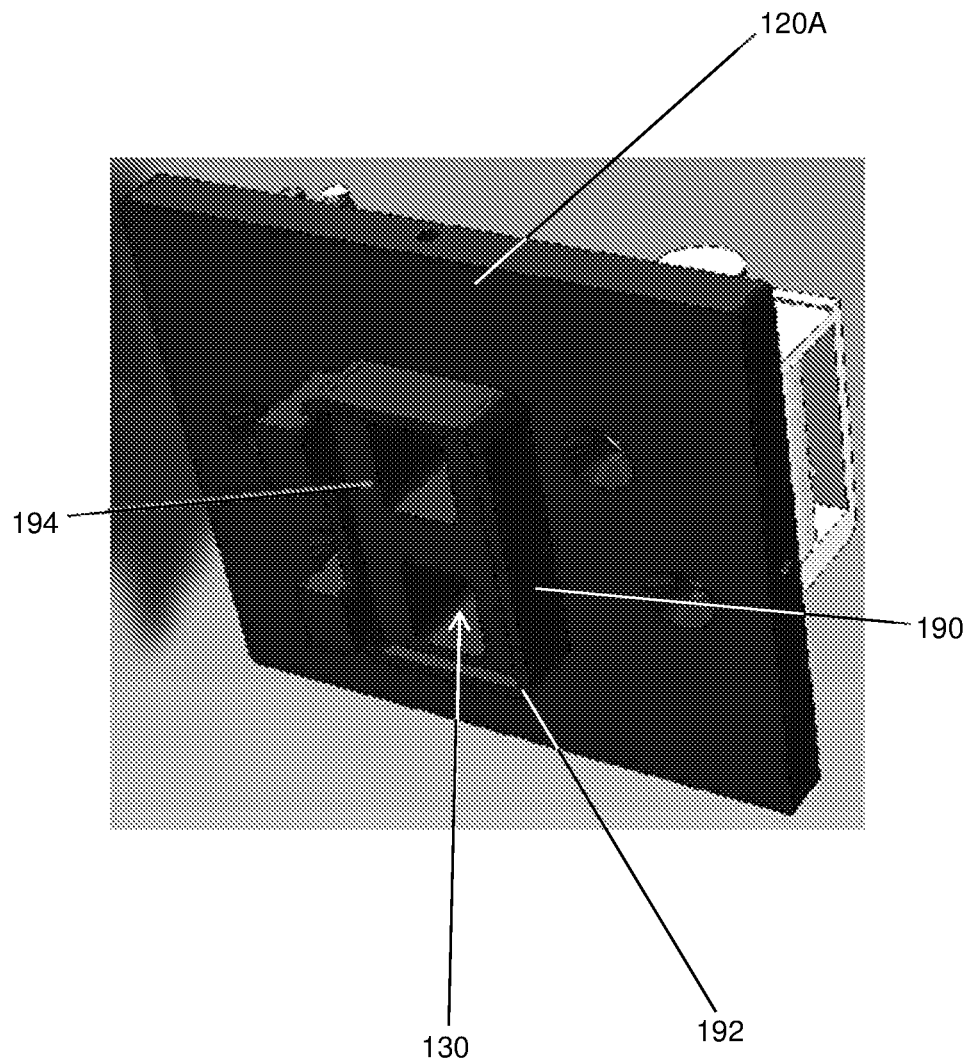
FIG. 3 shows a partial view of the exterior of a container of a detector.

FIG. 1 and FIG. 3 show that the lower surface of the base plate 120A has a dock 190. The dock is located around the through-bores providing the apertures 130 and has a rim 192 projecting away from the container 120 from its lowermost surface so that a recessed surface 194 is formed within the rim.

The external ends of the through-bores are formed in the recessed surface 194 of the dock 190. The recessed surface therefore provides a surface against which a sample holder 200 is able to abut to engage the sample holder with the exterior of the container 120.

The rim 192 also provides a surface against which the sample holder 200 abuts when engaged with the container exterior. The abutment between the rim and the sample holder provides alignment between the well 202 of the sample holder (see FIG. 1 and FIG. 4) in which the sample 204 is located and an aperture 130 in the container.

To try to prevent as much light as possible from passing between each sample holder 200 and the dock 190 into each respective aperture 130, the sample holder and the dock each have a complementary set of concentric ribs. The ribs on the dock are located in a ring around each position on the recessed surface 194 to which a sample holder is abutable, and give the portion on which they are located a textured nature.

Figure 4:
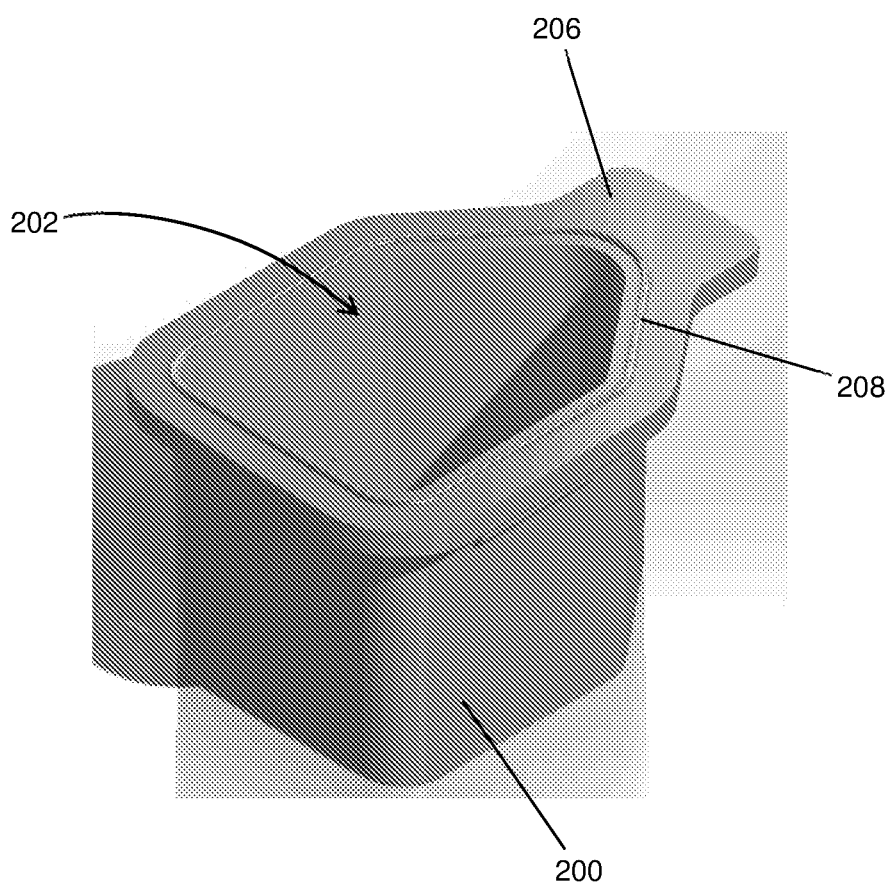
FIG. 4 shows a perspective view of a sample holder.

As shown in FIG. 4, the ribs 206 on each sample holder 200 are located in a ring around an engagement surface 208 of each respective sample holder that is placed in abutment with the recessed surface of dock when engaged with the exterior of the container 120. Again, the ribs on each sample holder give the portion on which they are located a textured nature.

As shown in FIG. 1, the ribs on each sample holder interdigitate with a set of ribs on the recessed surface 194 of the dock when engaged with the exterior of the container 120. This forms a light tight labyrinth 196 similar to that of the base plate 120A and enclosure 120B. Again, this light tight labyrinth limits light passage between the dock and each sample holder when engaged to up to about 200 photons per minute suppressing light ingress into an aperture.

Multiple sample holders 200 can be engaged with the container 120 at any one time. Each sample holder is removable from the container as indicated by arrow 210 in FIG. 1. It is also possible for there to be fewer sample holders engaged with the container than there are apertures 130 in the container. For example, of the two sample holders shown in FIG. 1, it is possible for one (or none) of the sample holders to be engaged with the container.

To avoid light from the environment around the detector 100 from entering the container 120 through each aperture 130, the detector has an engagement sensor 102 configured to detect when a sample holder is engaged with the container in alignment with each respective aperture. In the arrangement shown in FIG. 1, the engagement sensor is located on an end surface of the rim 192 of the dock 190 and is in contact with a sample holder 200 when the sample holder is engaged with the container.

Each engagement sensor 102 is a microswitch and forms part of a power circuit of one of the solenoids 170. Accordingly, where activated, a microswitch allows power to pass to one of the solenoids so that one of the shutters is able to be opened. As such, each respective microswitch is configured to activate when a sample holder 200 is engaged with the container 120 in alignment with the aperture 130 that the relevant shutter controls light passage through. This therefore prevents a shutter from being opened without a sample holder 200 being engaged with the container in alignment with the aperture from which the shutter is able to restrict passage of light into the container. Additionally, it allows a shutter to automatically open when a sample holder is engaged in an appropriate manner as long as power is supplied to the circuit for the appropriate solenoid.

In an alternative embodiment, instead of each microswitch forming part of a power circuit of a solenoid, thereby allowing power to pass to the respective solenoid when activated, each microswitch is connected to a Printed Circuit Board (PCB) or Programmable Logic Circuit (PLC). Accordingly, when a microswitch is activated, a signal passes to the respective PCB or PLC, which then determines whether to open or close a shutter based on the signals it receives.

To avoid images being captured when shutters that are supposed to be open are closed, the detector 100 has a shutter sensor 104 for each shutter 140. Each shutter sensor is configured to detect when a respective shutter is in the open position or in the closed position.

Any sensor that is able to detect whether a shutter is in the open or closed position without emitting light itself is suitable for use as the shutter sensor. Accordingly, a mechanical microswitch is suitable, as are various tactile sensors. However, an opto sensor would be unsuitable due to light emission from such sensors.

Turning to the sample holder 200, an example sample holder is shown in FIG. 4. The sample holder shown in FIG. 4 has a sample well 202 in which a sample 204 (shown in FIG. 1) is located. Each sample is a microarray, such as a biochip, holding a plurality of analytes or specimens.

The sample well has an opening at one end around which an engagement surface 208 is formed. As mentioned above, the engagement surface has a plurality of concentric ribs 206 formed in a ring around the engagement surface that forms part of a light tight labyrinth 196.

When samples in a plurality of sample holders 200 are to be analysed, the sample holders are held in a cartridge (not shown). The cartridge holds the sample holders in a particular arrangement, which is mirrored by at least a portion of the array of apertures of the detector.

Figure 5:
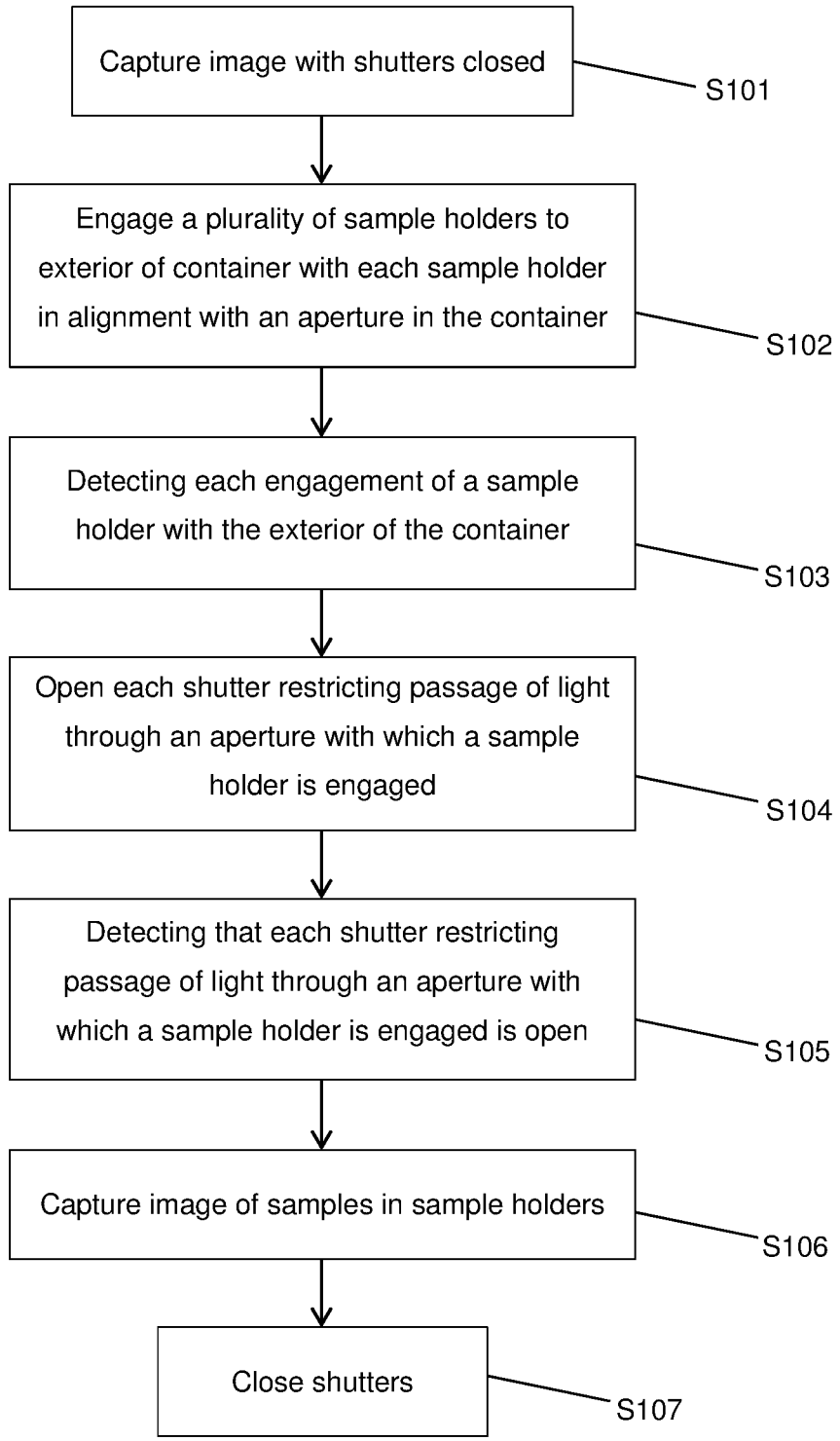
FIG. 5 shows a flow diagram of a chemiluminescence detection process.

Referring now to FIG. 5, to detect chemiluminescence from a plurality of analytes and/or specimens, the analytes and/or specimens are suitably prepared and applied to a one or more samples. The one or more samples are placed in one or more sample holders, which are then placed on a surface for analysis.

Before the samples are engaged with the container, an image is captured with the CCD camera of the detector with all of the shutters closed (S101). Of course, the container is closed as well with the base plate engaged with the enclosure.

Images taken with all the shutters closed are called "dark" images. These images are captured to allow noise cancellation to be conducted on the images captured when one or more shutters are open. In part this is why it is important to restrict light ingress to the container, as stray light ingress may cause additional noise or anomalies in images making noise cancellation more difficult thereby degrading the quality of the chemiluminescence detection.

Each sample holder is then engaged with the exterior of the container in alignment with an aperture in the container (S102). Optionally, the dark images are captured when the sample holder(s) is/are engaged with the exterior of the container as well or instead of before the sample holder(s) is/are engaged with the container.

The engagement of each sample holder with the exterior of the container in alignment with an aperture is detected by an engagement sensor (S103). The shutters for the apertures with which a sample holder is detected as being aligned is/are then opened (S104). The shutters for the apertures with which no sample holder is aligned remain closed. This prevents light from outside of the container and sample holders from entering the container. Again, this improves chemiluminescence detection as the amount of light entering the container is restricted as much as possible. Additionally, this improves detection by trying to limit the light sources to only the chemiluminescent samples.

Following this, the shutter sensors detect whether or not each shutter for the apertures with which a sample holder is detected as being aligned is in the open position (S105). If each shutter that is supposed to be open is detected as being open, an image is captured with the CCD camera (S106) of all the samples the sample holder of which is appropriately engaged with the container in the same exposure. The captured image is then processed to detect chemiluminescence.

The shutters are then closed (S107) and the sample holders are disengaged from the exterior of the container. Optionally, a further dark image is then taken.

The process is then able to be repeated for one or more further samples. When there are several sets of samples to be analysed, the detector is able to be moved from one set to another by means of a robotic arm to which the detector is attached.

As well as capturing images for sample analysis, images are able to be captured to calibrate an image processing system that is conducted on the images captured to detect the chemiluminescence.

The calibration process involves directing a uniform light source through all of the apertures and opening each of the shutters in a series of combinations including having single shutters open as well as multiple shutters open. An image is captured for each combination of open shutters and the images are analysed to assess the affect the light passing through each aperture or combination of apertures has on what is detected at the other apertures where the shutter is closed.

The invention claimed is:

1. A chemiluminescence detector, comprising:
an image capture device sensitive to chemiluminescence; and
a container within which the image capture device is located, the container having an array of apertures located in a field of view of the image capture device, each aperture of the array of apertures being provided defined by a through-bore in a wall of the container the container thereby having a plurality of through-bores, an exterior of the container being engageable with a plurality of sample holders, the container further comprising a dock located on the exterior of the container around the through-bores providing the apertures of the array of apertures, the dock being configured to hold each sample holder of the plurality of sample holders in alignment with a respective aperture of the array of apertures when engaged with the exterior of the container, and the container having at least one closure device, the at least one closure device being configured to restrict passage of light into the container through each aperture of the array of apertures thereby being controllable.

2. The detector according to claim 1, wherein a plurality of walls define the container, at least a part of the plurality of walls being separable from the container.

3. The detector according to claim 2, wherein the at least a part of the plurality of walls separable from the container has a perimeter surface abutting a complementary perimeter surface of the plurality of walls, said perimeter surfaces forming a complementary pair of perimeter surfaces, the respective complimentary pair of perimeter surfaces being configured to suppress light ingress to the interior of the container.

4. The detector according to claim 3, wherein each perimeter surface of the complementary pair of perimeter surfaces comprising a textured portion complementary to a textured portion on the perimeter surface with which the respective perimeter surface forms the complementary pair of perimeter surfaces.

5. The detector according to claim 4, wherein each textured portion comprises a plurality of ribs, each rib being a continuous ring oriented so that the ring extends along and around the textured portion, the plurality of ribs being arranged concentrically.

6. The detector according to claim 1, wherein the at least one closure device is a plurality of closure devices, wherein each closure device of the plurality of closure devices is able to restrict passage of light through only a single aperture of the array of aperatures.

7. The detector according to claim 6, wherein each closure device of the plurality of closure devices is able to restrict passage of light through a single aperture of the array of apertures independently of each other closure device.

8. The detector according to claim 1, wherein each closure device is moveable between a closed position and an open position, wherein in the closed position each respective closure device provides a barrier between the exterior of the container and the interior of the container across the entirety of each aperture of the array of apertures through which said closure device is able to restrict the passage of light, and in the open position the barrier is only across a part of each aperture of the array of apertures through which said closure device is able to restrict the passage of light or is completely removed from being across each aperture of the array of apertures through which said closure device is able to restrict the passage of light.

9. The detector according to claim 8, wherein each closure device is a shutter.

10. The detector according to claim 9, wherein in the closed position, a surface of each respective shutter abuts a wall of the container on the inside of the container and is located over at least one through-bore defining an aperture of the array of apertures, and in the open position, there is a gap between said surface of said shutter and said wall of the container.

11. The detector according to claim 9, wherein each shutter is rotatable about an axis at an edge of the respective shutter.

12. The detector according to claim 11, wherein each shutter is rotatable by a motor, optionally the motor comprising a solenoid with a bore therethrough within which is located a magnet, the magnet being connected to a rack with which a pinion is engaged, the pinion being connected to the shutter with its centre aligned with the axis about which the shutter is rotatable.

13. The detector according to claim 12, wherein the solenoid is bi-stable.

14. The detector according to claim 9, wherein each shutter is bias towards the closed position.

15. The detector according to claim 14, wherein the bias is provided by a spring.

16. The detector according to claim 15, wherein the spring is a torsion spring.

17. The detector according to claim 1, wherein the dock is configured to restrict passage of light between the exterior of the container and each sample holder when engaged with the exterior of the container.

18. The detector according to claim 17, wherein the dock comprises a recessed portion shaped to fit a plurality of sample holders when engaged with the exterior of the container.

19. The detector according to claim 1, further comprising a sensor configured to detect when each closure device is in an open position or in a closed position; and/or further comprising a sensor configured to detect when a sample holder is engaged with the exterior of the container.

20. A chemiluminescence detection apparatus, comprising:

a chemiluminescence detector according to claim 1; and
a plurality of sample holders detachably engagable with the exterior of the container of the detector, each sample holder of the plurality of sample holders containing at least one sample.

21. The apparatus according to claim 20, wherein the exterior of the container and each sample holder of the plurality of sample holders are configured to suppress light ingress between the exterior of the container and respective sample holder of the plurality of sample holders when said sample holder is engaged with the exterior of the container.

22. The apparatus according to claim 21, wherein the exterior of the container comprises a textured portion around each position at which a sample holder of the plurality of sample holders is able to be engaged and each sample holder of the plurality of sample holders comprising a textured portion complementary to the textured portion of the exterior of the container on a surface of the respective sample holder of the plurality of sample holders that abuts the exterior of the container when the respective sample holder of the plurality of sample holders is engaged with the exterior of the container.

23. The apparatus according to claim 22, wherein each textured portion comprises a plurality of ribs, each rib being a continuous ring orientated so that the rind extend along and around the textured portion, the plurality of ribs being arranged concentrically.

24. The detector according to claim 1, wherein the dock comprises a rim defining an area within which the sample holders fit when engaged with the dock, the rim further providing an abutment surface for sample holders, the abutment surface defining the orientation in which the sample holders are able to be positioned when engaged with the dock.

25. A method of detecting chemiluminescence, comprising:

engaging at least one sample holder containing at least one sample with an exterior of the container of the detector according to claim 1 at the dock of the container to hold the at least one sample holder in alignment with an aperture or the array of apertures of the detector in the wall of the container of the detector when engaged with the exterior of the container;

opening the closure device of the detector restricting passage of light into the container through the aperture of the array of apertures to allow light to pass into the container from the at least one sample holder;

capturing an image of a sample within the at least one sample holder with the image capture device of the detector, the field of view of which the aperture of the array of apertures is located within; and closing the closure device to restrict passage of light into the container through the aperture of the array of apertures.

26. The method according to claim 25, further comprising the step of detecting that at least one sample holder is engaged with the exterior of a container before opening the closure device, and only opening a closure device when a sample holder is detected as being engaged with the exterior of the container in alignment with the aperture through which the closure device restricts passage of light; and/or further comprising the step of detecting that the closure device is open before capturing an image of the sample; and/or further comprising the step of capturing an image with the image capture device before opening the closure device, and optionally before engaging the at least one sample holder with the exterior of the container.

27. The method according to claim 25, wherein there are a plurality of closure devices, each closure device being able to restrict passage of light through only a single aperture of the array of apertures, the method further comprising the step of only opening each respective closure device restricting passage of light through an aperture of the array of apertures when a sample holder is engaged with the exterior of the container and is in alignment with the aperture of the array of apertures through which the respective closure device is restricting passage of light.

* * * * *